Sept. 18, 1956     J. H. TADLOCK     2,763,090
ROCK SINKER
Filed Dec. 19, 1952     2 Sheets-Sheet 1
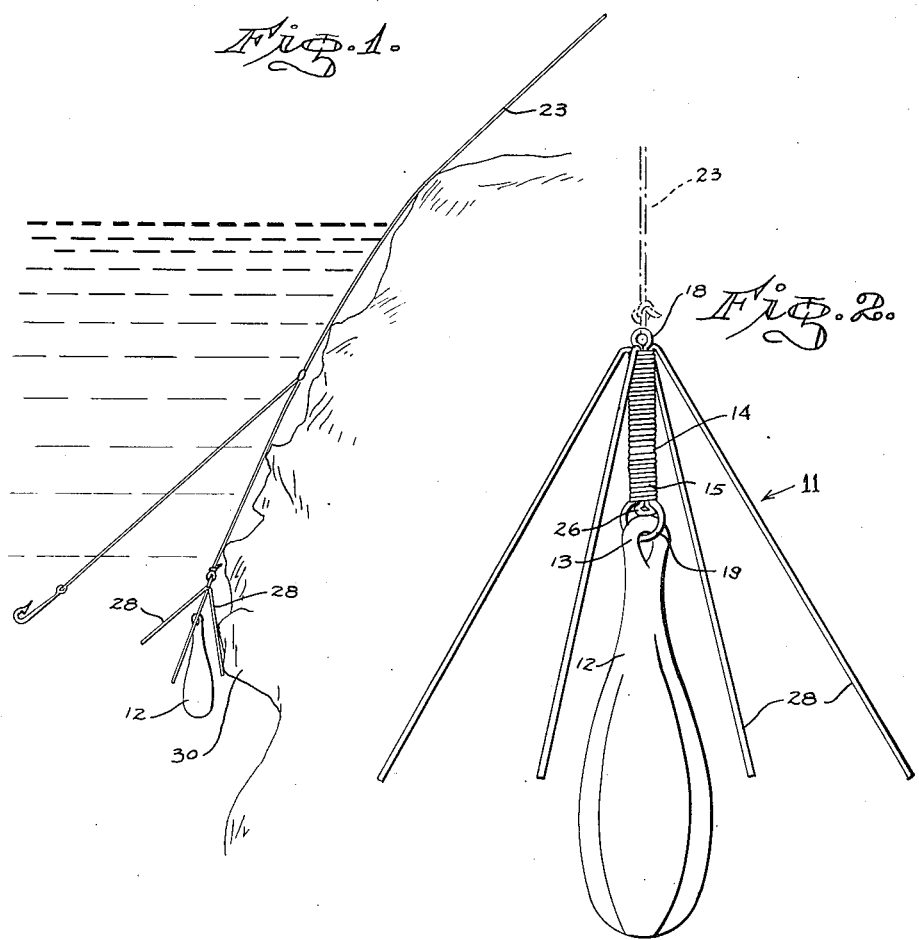
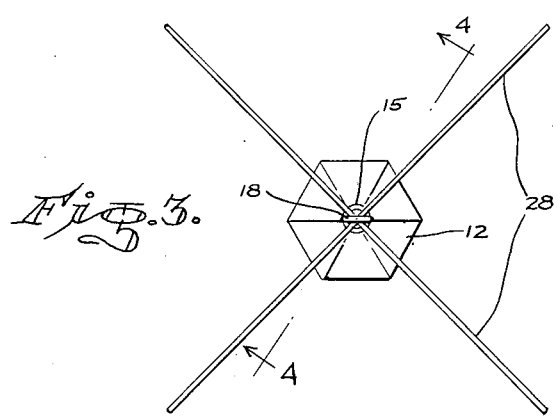
INVENTOR.
Joseph H. Tadlock
BY
McMorrow, Berman & Davidson
ATTORNEYS

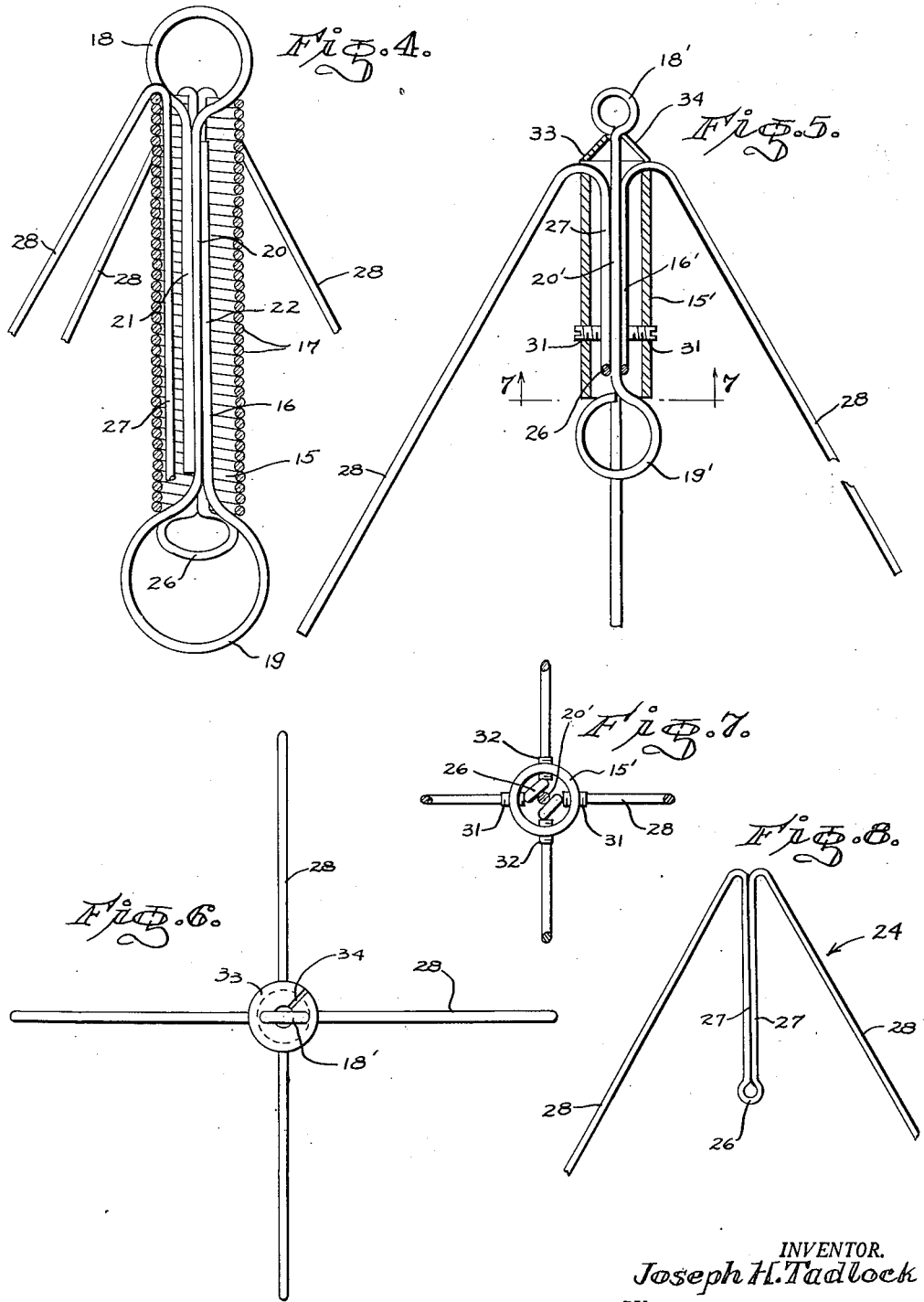

United States Patent Office 2,763,090
Patented Sept. 18, 1956

2,763,090

ROCK SINKER

Joseph H. Tadlock, Coos Bay, Oreg.

Application December 19, 1952, Serial No. 326,825

2 Claims. (Cl. 43—44.97)

This invention relates to fishermen's equipment, and more particularly to an improved trolling sinker adapted to be used when fishing in the vicinity of rocks or other obstructions.

The main object of the invention is to provide a novel and improved trolling sinker which is simple in construction, which is relatively compact in size, and which is arranged so that the weighted element thereof cannot become entangled with rocks or similar obstructions, whereby loss of the sinker is prevented.

A further object of the invention is to provide an improved trolling sinker particularly adaptable for use in fishing in locations where there are rocks or other obstructions, the improved sinker being inexpensive to manufacture, being rugged in construction, and being arranged so that the sinker is moved away from the obstructions, such as rocks or the like, in response to a pull on the fishing line, whereby loss of the sinker is prevented.

Further objects and advantages of the invention will become apparent from the following description and claims, and from the accompanying drawings, wherein:

Figure 1 is a side elevational view showing an improved sinker according to the present invention connected to the end of the fishing line and indicating the manner in which the guard fingers on the sinker prevent the sinker from becoming entangled with the obstructions and automatically wove the sinker away from the obstructions in response to a pull on the fishing line.

Figure 2 is an enlarged side elevational view of the improved rock sinker employed in Figure 1.

Figure 3 is a top view of the rock sinker in Figure 2.

Figure 4 is an enlarged vertical cross sectional view taken on the line 4—4 of Figure 3.

Figure 5 is a vertical cross sectional view similar to Figure 4 but showing a modified form of rock sinker according to the present invention.

Figure 6 is a top plan view of the rock sinker illustrated in Figure 5.

Figure 7 is a horizontal cross sectional view taken on the line 7—7 of Figure 5.

Figure 8 is a side elevational view of one of the guard finger structures employed in the improved rock sinker of the present invention.

Referring to the drawings, and more particularly to Figures 1 through 4, 11 generally designates one form of improved rock sinker according to the present invention. The rock sinker comprises an elongated weight element 12 which is formed at its top end with the eye 13. Designated at 14 is a line connector which comprises a sleeve-like member 15 containing a link member 16. As shown in Figures 2 and 4, the sleeve-like member 15 may comprise a coiled wire structure having the closely spaced turns of wire 17, the wire being relatively stiff, whereby the structure retains a generally cylindrical shape, as illustrated. The link member 16 comprises a single piece of wire which is bent to define the top and bottom loops 18 and 19, the intermediate straight portion 20, and the respective vertical straight portions 21 and 22 which are disposed against the intermediate straight portion 20, as shown in Figure 4. The end loops 18 and 19 are respectively larger in diameter than the sleeve-like member 15, whereby the link member 16 is retained in said sleeve member and is held against endwise movement therein. As shown in Figure 1, the bottom loop 19 is engaged with the eye 13 of the weighted member 12, and the top loop 18 is connected to the fishing line, shown at 23.

Designated at 24 are the guard finger members, each guard finger member comprising a single piece of wire bent to define the central bottom loop 26, the vertical arm elements 27, 27 which are in abutment with each other and which are of substantial length, and the downwardly and outwardly inclined guard fingers 28, 28 which extend downwardly and outwardly, as shown in Figure 8, from the top ends of the straight portions 27, 27. As shown in Figure 4, a pair of guard finger members 24 are employed in each rock sinker assembly, the arm elements 27, 27 being received in the sleeve-like member 16 and the bottom loops 26 of the guard finger members being engaged against the bottom end of said sleeve-like member, said bottom loops 26 being larger in horizontal width than the inner diameter of said sleeve-like member, whereby the guard finger members 24 are retained in the sleeve-like member.

In assembling the device thus described, the top loop 18 is inserted in the lower end of the sleeve-like member 16 and then distorted so that it is engaged by the inner surface of the member 16 whereupon it is pushed through and out of the upper end of the member 16 by application of pressure to the bottom loop 19. When the top loop 18 has been ejected wholly from the upper end of the member 16 the loop 18 is then restored to its original form and then bears against the upper end of the member 16.

As shown in Figure 2, the guard fingers 28 extend downwardly and outwardly around the weight member 12 for a substantial distance, and serve as a protective skirt or shield relative to said weight member to prevent the weight member from becoming entangled with rocks or obstructions, such as the rocks 30 illustrated in Figure 1, as the fishing line 23 is pulled forwardly. As will be readily apparent from Figure 1, when the fishing line 23 is pulled, the fingers 28 engage the rocks 30 and act to deflect the weight member 12 away from the rocks. Therefore, loss of the sinker is effectively prevented.

In the form of the invention illustrated in Figure 5, the sleeve-like member is designated at 15' and comprises a length of cylindrical tubing provided with the two pairs of diametrically opposed set screws 31, 31 and 32, 32. As shown, the set screws are located in a common horizontal plane near the lower end of the sleeve-like member 15'. The arms 27 of the guard finger members 24 are disposed vertically in the sleeve-like member 15', as illustrated, the sleeve-like member being somewhat larger in diameter than the bottom end loops 26 of the guard finger members. Designated at 16' is the link member which merely comprises a straight intermediate portion 20' having the respective top and bottom end loops 18' and 19'. As shown in Figure 5, the straight portion 20' is disposed axially in the sleeve-like member 15' and the straight elements 27 of the guard finger members are disposed parallel to and in contact with the element 20'. The set screws 31, 31 and 32, 32 respectively clampingly engage the elements 27 and exert inward clamping force thereon, urging the elements 27 against the axial link element 20'. With the screws 31, 31 and 32, 32 tightened, the elements 27 and 20' are rigidly secured to the sleeve-like member 15'.

Engaged around the upper portion of the link element 20' is the conical washer 33 whose top end abuts the loop 18' and whose bottom rim abuts the top rim of the sleeve-like member 15'. In the arrangement illustrated in Figure 5, the top loop 18' is smaller in diameter than the sleeve-like member 15' and consequently, the conical washer 33 is employed to prevent the link member 16' from becoming disengaged from the sleeve-like member 15'. The washer 33 is split radially at 34 to allow said washer to be mounted around the intermediate arm portion 20' of the link member 16'. The fishing line is connected to the top loop 18' and the weighted member 12 is connected to the bottom loop 19', thus providing the completed sinker assembly which is employed in the same manner as the previously described form of the invention.

While certain specific embodiments of an improved trolling sinker have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an antisnag device for connection between a sinker and fishing line, a sleeve-like member open at both ends thereof; a link member extending through and projecting at its opposite ends from said ends of the sleeve-like member, said link member extending longitudinally and centrally of the sleeve-like member and having a transverse dimension substantially less than the inner diameter of the sleeve-like member so as to cooperate therewith in defining an annular open space about the link member within the sleeve-like member, the link member including eyes at its projecting ends one adapted for connection to a fishing line and the other adapted for connection to a sinker, said eyes forming abutments engaging the opposite ends of the sleeve-like member to retain the link member against longitudinal movement relative to the sleeve-like member; and a plurality of guard finger members angularly spaced about the link member, each guard finger member being formed from a single length of wire material and including a pair of longitudinally contacting arm elements coextensive in length with each other and extending within said open space, said arm elements being integrally connected to each other at one end and being engaged by the sleeve-like member adjacent their connected ends against longitudinal movement relative to the sleeve-like member in at least one direction, and guard fingers integral with the other ends of the arm elements and extending in acute angular relation to the arm elements exteriorly of the sleeve-like member, the guard finger members engaging against one end of the sleeve-like member at the juncture between the guard fingers and arm elements thereof to hold the guard finger members against longitudinal movement relative to the sleeve-like member in a direction opposite said one direction.

2. In an antisnagging device for connection between a sinker and fishing line, a sleeve-like member formed from a length of stiff wire material coiled into a generally cylindrical shape and having its convolutions spaced closely and formed equal to one another in respect to the inner diameter thereof, said member being open at both ends thereof; a link member extending through and projecting at its opposite ends from said ends of the sleevelike member, said link member being formed from a single length of wire material shaped to include a straight part extending longitudinally and centrally of the sleeve-like member and eyes at opposite ends of the straight part projecting out of the respective ends of the sleevelike member and having an outer diameter greater than the inner diameter of the sleeve-like member, the straight part having a transverse dimension substantially less than the inner diameter of the sleeve-like member so as to cooperate therewith in defining an annular open space about the link member within the sleeve-like member, said eyes abutting against opposite ends of the sleevelike member to engage the link member against longitudinal movement relative to the sleeve-like member, one of said eyes being adapted for connection to a fishing line and the other being adapted for connection to a sinker; and a plurality of guard finger members angularly spaced about the link member within said open space, each formed from a single length of wire material including a pair of longitudinally contacting arm elements coextensive in length with each other and extending within said open space, a loop integrally connecting the arm elements to each other at one end, said loop being greater in outer diameter than the inner diameter of the sleevelike member and abutting against one end of the sleevelike member to retain the guard finger member against longitudinal movement relative to the sleevelike member in one direction, and guard fingers integrally formed on the other ends of the arm elements and extending in acute angular relationship to the arm elements exteriorly of the sleeve-like member, the guard finger members engaging against the other end of the sleevelike member at the juncture between the guard fingers and arm elements thereof, to hold the guard finger members against longitudinal movement relative to the sleevelike member in another direction.

References Cited in the file of this patent

UNITED STATES PATENTS

| | | |
|---|---|---|
| 664,476 | Hall | Dec. 25, 1900 |
| 769,356 | Reis | Sept. 6, 1904 |
| 824,739 | Phelps | July 3, 1906 |
| 1,516,940 | Winchell | Nov. 25, 1924 |
| 1,768,033 | Deatz | June 24, 1930 |
| 2,074,258 | Fravel | Mar. 16, 1937 |
| 2,157,414 | Johnson | May 9, 1939 |
| 2,185,065 | Schmaltz | Dec. 26, 1939 |
| 2,490,460 | McAvoy | Dec. 6, 1949 |

FOREIGN PATENTS

| | | |
|---|---|---|
| 481,460 | Canada | Mar. 4, 1952 |